United States Patent [19]

Schmidt

[11] Patent Number: 5,082,572

[45] Date of Patent: Jan. 21, 1992

[54] ASH VIBRATION PROCESS AND APPARATUS

[75] Inventor: John K. Schmidt, Moorseville, Ind.

[73] Assignee: Ogden Martin Systems, Inc., Fairfield, N.J.

[21] Appl. No.: 577,365

[22] Filed: Sep. 5, 1990

[51] Int. Cl.$^5$ .......................... C02F 1/34; B01D 43/00
[52] U.S. Cl. .......................... 210/744; 110/165 A; 110/165 R; 110/171; 110/259; 210/388; 210/523; 210/525; 210/803
[58] Field of Search ............... 210/803, 523, 525, 388, 210/744; 110/165 R, 165 A, 171, 259; 126/243

[56] References Cited

U.S. PATENT DOCUMENTS

| | | | |
|---|---|---|---|
| 1,492,937 | 5/1924 | Ross | |
| 2,160,026 | 5/1939 | Martin | 110/171 |
| 2,600,896 | 6/1952 | Martin | 110/165 |
| 3,508,660 | 4/1970 | Takano | 210/167 |
| 3,734,037 | 5/1973 | Martin | 110/165 R |
| 3,773,661 | 11/1973 | Talley | 210/19 |
| 3,915,105 | 10/1975 | Michelbrink | 110/165 R |
| 4,039,456 | 8/1977 | Stoev et al. | 210/388 |
| 4,046,694 | 9/1977 | Ellis | 210/297 |
| 4,048,928 | 4/1977 | Martin | 110/171 |
| 4,267,046 | 5/1981 | Stoev et al. | 210/780 |
| 4,286,527 | 9/1981 | Robinson et al. | 110/165 A |
| 4,756,829 | 7/1988 | Eöhringer | 210/241 |
| 4,831,940 | 5/1989 | Franza | 110/259 |
| 4,976,206 | 12/1990 | Steiner et al. | 110/171 |

FOREIGN PATENT DOCUMENTS

| | | | |
|---|---|---|---|
| 1196607 | 11/1985 | Canada | 209/65 |
| 029235 | 5/1981 | European Pat. Off. | 110/171 |
| 3312246A1 | 10/1983 | Fed. Rep. of Germany | 210/388 |
| 261197A1 | 10/1988 | German Democratic Rep. | 110/171 |
| 61-295413 | 12/1986 | Japan | 110/171 |
| 645678 | 2/1979 | U.S.S.R. | 210/388 |
| 1026845A | 7/1983 | U.S.S.R. | 210/803 |
| 980764 | 12/1983 | U.S.S.R. | 210/388 |

*Primary Examiner*—Robert A. Dawson
*Assistant Examiner*—Sun Uk Kim
*Attorney, Agent, or Firm*—Dickstein, Shapiro & Morin

[57] ABSTRACT

An apparatus and method for dewatering combined ash or other combustion related products. The apparatus aspects of the invention consist of a quench bath having a curved portion containing a plunger adapted to push combustion materials contained in the quench bath up an inclined trough. A vibrator is mounted below a portion of the inclined trough located above the waterline in the quench bath. As a result, material moved up the inclined portion is subject to vibration and compaction resulting in a substantial dewatering of the combustion material. The method of the present invention provides for the steps of quenching, moving and vibrating combustion by-products to obtain a dewatered material having reduced free water run-off.

6 Claims, 3 Drawing Sheets

FIG. 3
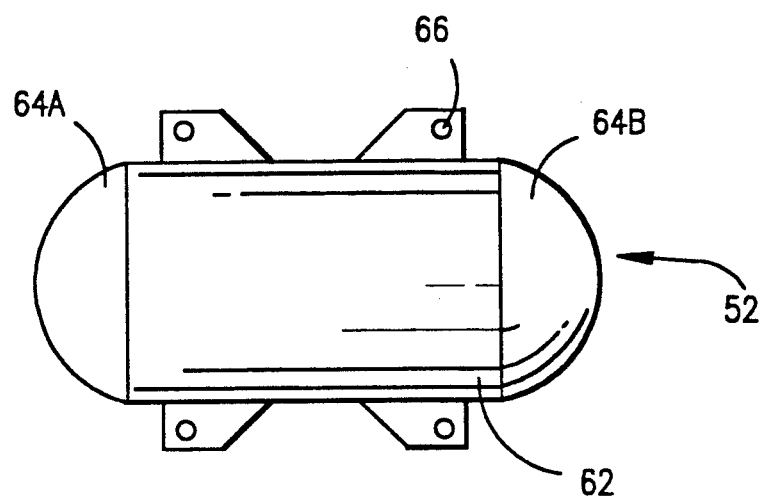
FIG. 4
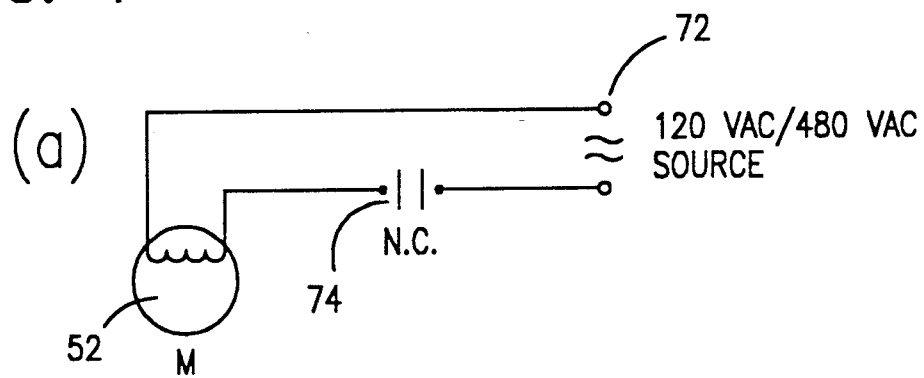
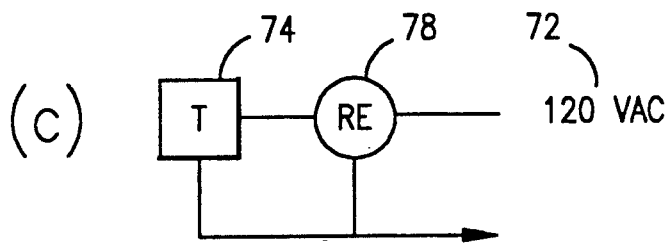
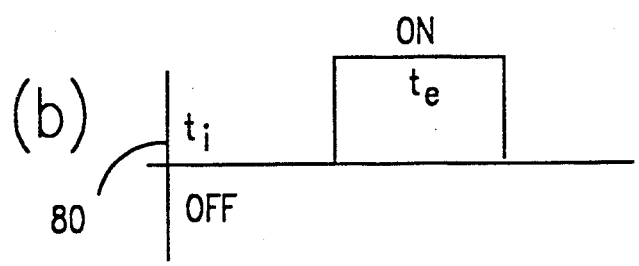

ASH VIBRATION PROCESS AND APPARATUS

TECHNICAL FIELD OF THE INVENTION

The present invention relates to a device and process for dewatering combined ash treated in a quench bath.

BACKGROUND OF THE INVENTION

The main by-products of waste incineration include bottom ash which is released directly from the incinerator furnace and fly ash which is collected in the boiler hoppers and from the hoppers of the air pollution control equipment associated with an incinerator or power generation system. With increasing emphasis being placed on providing better air pollution control of incinerator and power generator plant emissions, most, if not all, incineration and power generation systems utilize air pollution control equipment that injects alkalis into a plant's various gas passages and/or combustion zones. As a result, the reacted and unreacted alkalis remain in the ash and particularly in the fly ash.

The unreacted alkalis cause the combustion by-products to exhibit varying degrees of hygroscopicity when the material is quenched. Following quenching, the combined ash often exhibits significant free water run-off or in extreme situations may coat downstream equipment. The water run-off is problematic for downstream conveyors since expensive additional equipment is needed to collect the excess water. Additionally, the relatively wet condition of the material also adversely affects the downstream recovery of ferrous scrap from the waste stream. More critically, the free water run-off increases the potential for pollution resulting from the leaching of toxins contained in the ash into the ground water and aquifers at the disposal sites.

Although a number of treatments for stabilizing combined ash have been proposed, none exist that substantially dewater the combined ash efficiently, quickly and economically without the use of expensive plant equipment, chemical fixation agents or complex mechanical treating devices. Moreover, an apparatus does not exist that takes advantage of pre-existing equipment and that achieves substantial results while making only minor modifications to such equipment.

SUMMARY OF THE INVENTION

In view of the foregoing, therefore, it is apparent that there exists a need for a process and apparatus that provides for an automatic, efficient, simple and inexpensive combined ash dewatering process and apparatus that can be combined with conventional quench bath equipment in order to produce a combined ash having a low moisture content.

It is therefore an object of this invention to provide for a combined ash dewatering system that first collects the combined ash in a quench bath in order to reduce an amount of fugitive dust.

It is a further object of this invention to provide for a dewatering device comprising a vibrating motor that is located along an inclined spout of the quench bath such that the vibrations caused by the vibrating motor cause a substantial dewatering of the combined ash.

It is yet an additional object of the invention to provide for a fly ash dewatering apparatus whereby the eccentricity of the vibrator can be adjusted and the active vibration time periods can be controlled in order to increase or decrease the moisture content of the resulting ash or to adjust the apparatus to the specific characteristics of the combined ash produced by the incinerators/boilers.

These and other objects of the invention are achieved by an apparatus for dewatering combined ash that includes a quench bath having a hydraulically operated ram which reciprocates along a first inclined portion of the quench bath and a vibrating motor on an inclined spout of the quench bath whereby the hydraulic ram pushes combined ash contained in the quench bath slowly off the inclined spout. At the same time, the vibrator causes vibration and dewatering of the ash before it completely exits the inclined spout of the quench bath into a downstream shaking conveyor device. As a result, a substantially dewatered combined ash is produced causing minimum hazards to the downstream equipment and having a minimum impact on the environment.

Features and objects of the present invention will be apparent from the following brief description of the drawings, detailed description of the preferred embodiments, the claims and the accompanying drawings.

BRIEF DESCRIPTION OF THE DRAWINGS

FIG. 3 is a top view of the vibrator motor 52 of FIG. 1; and

FIGS. 4a–c show the motor connections and timing chart of the motor of FIG. 3.

DETAILED DESCRIPTION OF THE PREFERRED EMBODIMENT

Figure 1:
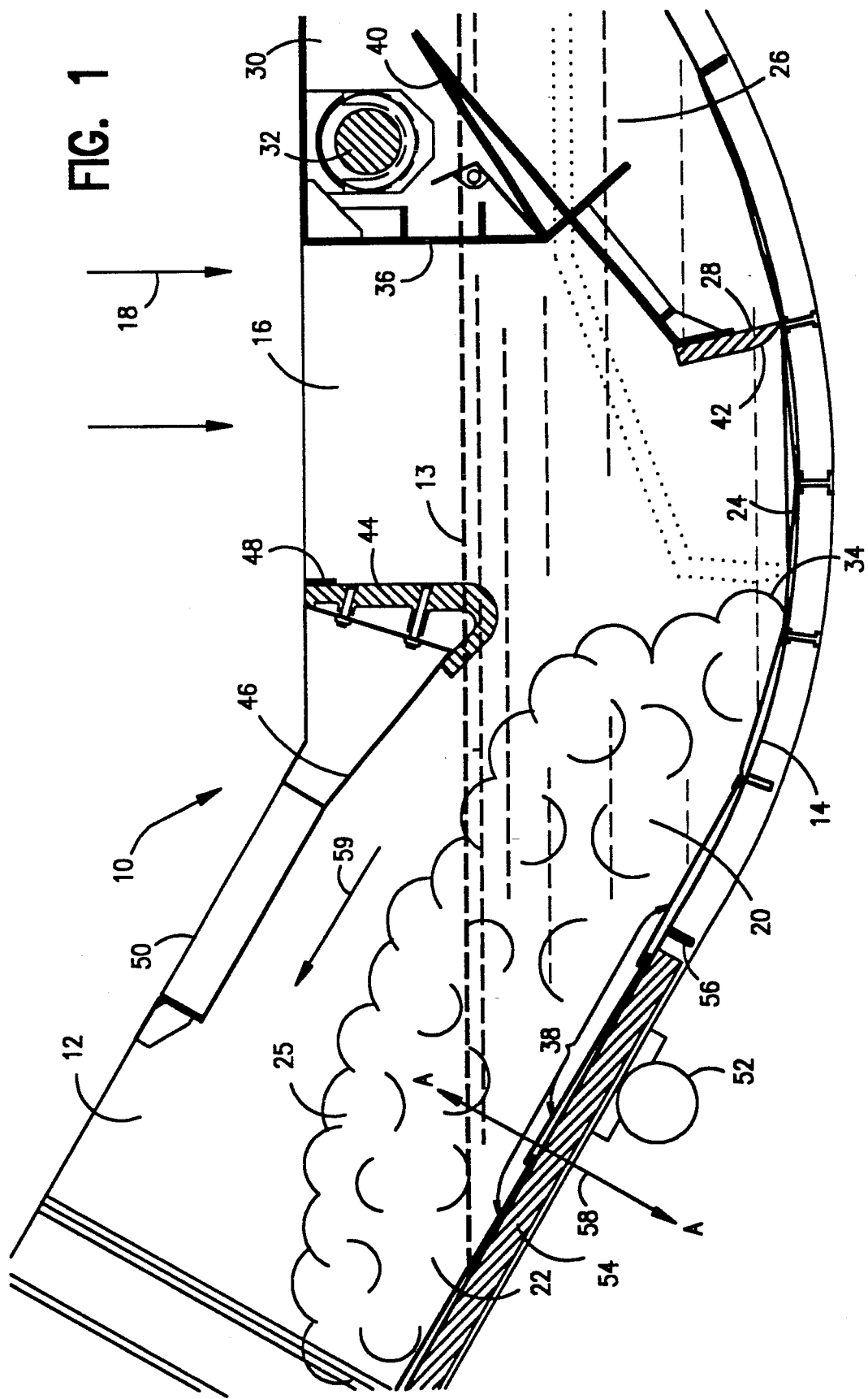
FIG. 1 is a cut-away side view of the combined ash dewatering apparatus according to the present invention.

Referring now to FIG. 1 wherein like reference numeral refer to like parts throughout, FIG. 1 illustrates an apparatus for treating combined ash produced from an incinerator or power generation system.

It is known to provide a discharge and quench bath located at the bottom of the furnace. Typical quench bath systems include a water filled trough which is provided with some form of a displaceable pusher that reciprocates horizontally in order to displace combined ash dropped into the trough. The advantage of a quench bath is that it produces ashes that are cool and sufficiently moistened to prevent escaping fugitive dust from contaminating the plant. Extraneous air is also prevented from entering the furnace chamber by virtue of a fluid seal provided by the water in the quench bath. The water seal also prevents gases and heat from escaping from the incinerator area and causing serious injury to plant employees.

More particularly, as shown in FIG. 1, a quench bath 10 is illustrated. The bath 10 comprises a receptacle 12 having an arcuate shape. The receptacle 12 includes a bottom wall 14 that is curved at the portion located substantially below the point where ashes drop into the receptacle 12 through a chute 16 in the direction of arrows 18. A water bath is provided within the receptacle chamber 12 to a predetermined level 13. The water level 13 is critical since the water forms a seal with the walls 36 and 44 which prevents hot gases and other contaminants produced by the incinerator from escaping into the facility.

The shape of the bottom wall 14 of the quench bath 10 includes a curved bottom portion 24 and a slanting discharge trough portion 22. The bottom wall of the slanting discharge portion 22 is made up in its interior of a plurality of plates 38 in order to prevent the combined ash from sliding back down the inclined trough.

Located within the quench bath 10 and slidable along curved portion 24 is a hydraulically actuated plunger 26 adapted to reciprocate to the end limit shown by the dotted lines. The plunger 26 is connected to a lever arm 30 that is turned about a horizontally disposed shaft 32 back and forth between those positions shown in solid and broken lines.

The plunger 26 is sealed to the curved portion 24 by means of a shoe 42 which is adapted to slide along the curved portion 24. In addition, a seal 40 is provided above the plunger 26 to prevent the admixture of the quench bath liquid that is located below the chute 16 and that is contaminated with particles and debris with the liquid contained behind the plunger 26. The seal, therefore, prevents dirt and debris from getting caught in the pusher. Further sealing of the device is insured by a chute wall 36 under which the pusher 26, in combination with the seal 40, remains substantially in contact throughout the movement of the pusher 26. A second chute wall 44 is also provided. The wall 44 is connected to a transition plate and has a curved portion which is designed to withstand substantial impacts caused by objects contained in the bath that contact the wall 44. The second chute wall 44 is thereby designed to be replaceable.

The dewatering aspects of the invention are provided by a vibrating device 52 which is attached to the lower wall 14 located along a slanting discharge trough 22. Typically, the vibrating device will include a vibrating motor 52 having an eccentric shaft. The examples of the motor include a 1.5 hp unit manufactured by Motomagnetic Vibrators having a 3800 vpm force whose output is approximately 3,000 lbs. per kilogram. The magnet is manufactured by Martin Engineering Co. A larger or smaller motor can be used, as needed, depending on the desired force. However, selecting a larger motor will enable the operator to vary the amount of power and eccentricity to achieve the desired level of dewatering.

The vibrator motor 52 is, in turn, attached to a reinforcement plate 54 that is connected between cross beams that extend along the longitudinal axis of the discharge trough 22. As a result, vibration or motion of the unit 52 is imparted along the rotational direction of the motor across the width of the shaft 22 and oscillations are produced in the direction of arrows A—A.

In operation, when the trough 10 is filled with water to the level 13, ash falls into the shaft 16 in the direction of arrows 18 before the plunger 26. The plunger then reciprocates forward using its transverse push bar 28 to push the material 25 toward the inclined trough 22. The ash moves upward through the inclined trough 22 in a direction indicated by arrow 59. As the plunger 26 returns to the position shown by the solid lines from that shown by the broken lines, the combined ash 25 in the inclined trough 22 is prevented from sliding back by the resistance offered by the ledges of the plates 38.

While the ash 25 moves upward along the slanting discharge trough 22, the electric vibrator 52 is actuated, imparting an oscillatory force substantially vertical to the longitudinal axis of the slanting discharge portion 22. The vertical motion also is imparted across the entire width of the trough 22. The oscillations produce a vibrational effect on the combined ash causing the compression of the materials supplied to the quench bath 10.

Since the vibrator motor 52 is located at a point in the trough where the combined ash is above the quench bath level 13, water and/or other liquids contained in the material are squeezed out of the material which then flow down the inclined trough 22 toward the bath 13. A compressed and dewatered material is then pushed out of the quench bath spout following subsequent motion by the plunger 26. As result an average moisture content of between 25–40% is dewatered to an average moisture of 15–25%.

Figure 2:
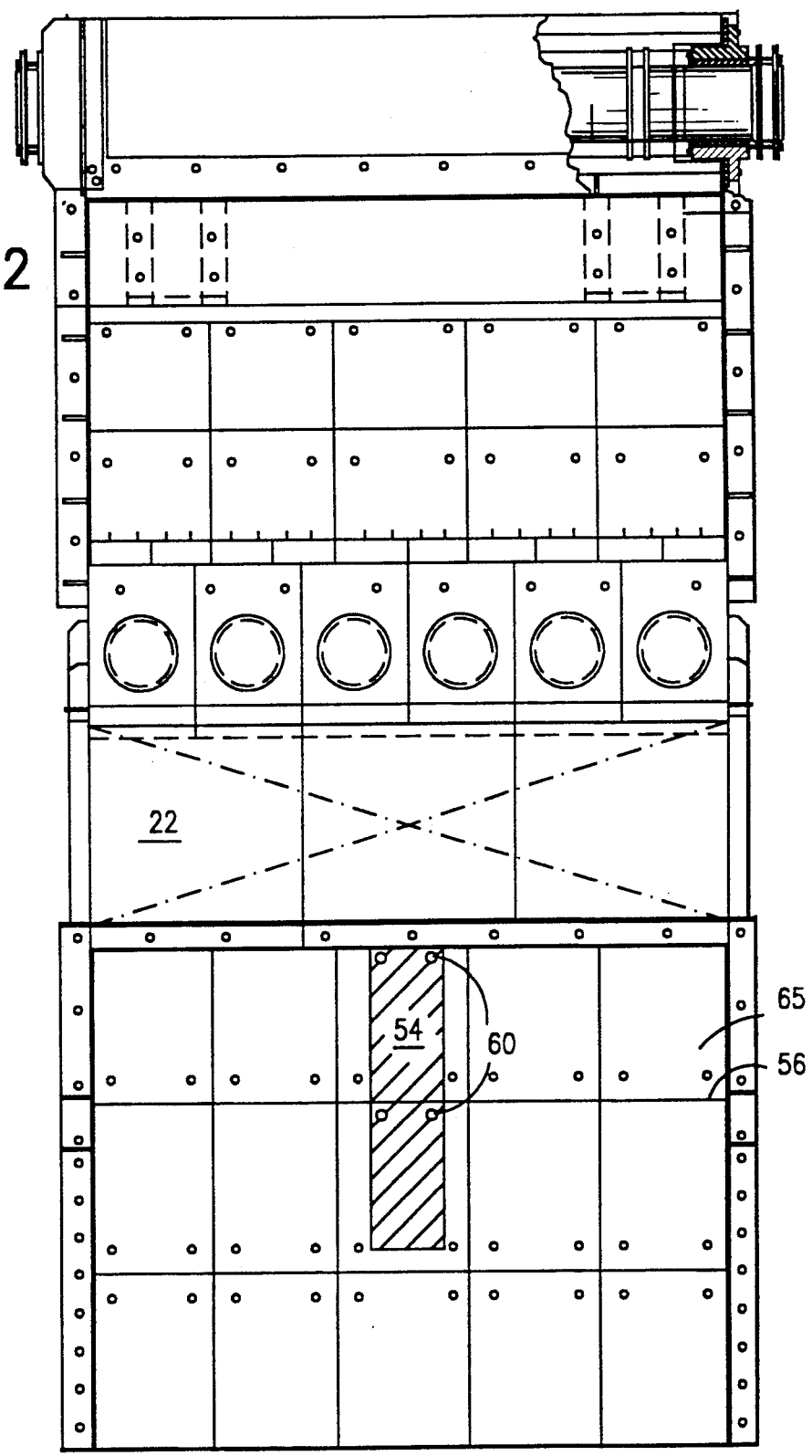
FIG. 2 is bottom view of the inclined spout portion of the dewatering apparatus of FIG. 1.

Referring now to FIG. 2, a bottom view of the slanting discharge trough 22 is illustrated. As shown, the reinforcement plate 54 for the vibrator 52 is connected to a plurality of plates 65 that form the bottom wall 14 of the slanting discharge trough 22. The reinforcement plate 54 is connected to the bottom plates through access points 60 which respectively mount the vibrator (not shown). The orientation of the reinforcement plate 54 is perpendicular to cross beams 56 so that vibrations caused by the motor can be imparted across the entire width of the discharge trough 22. However, any suitable mounting design utilizing reinforcement plates, beams or other arrangements is contemplated in order than an even oscillation is imparted across the width of the trough 22.

FIG. 3 illustrates a top view of the vibrating motor 52. As shown, the motor consists of a main body portion 62 having an eccentrically mounted shaft. Eccentricity adjustments are made at ends 64a and 64b. The motor is mounted on the reinforcement plate 54 at the cutout through access points (FIG. 2).

Electrical connections for the motor 52 are shown in FIG. 4a. The motor 52 is connected to a 120 VAC/480 VAC power supply 72. The motor is switched on and off by means of an oscillator circuit 74. The oscillator 74, shown in more detail in FIG. 4c, where it is connected respectively to a relay 78, is in turn connected to the voltage source 72. As a result, the motor is timed on for a discrete time portion T2 and off for the time portion T1, as shown in FIG. 4b. As a result, the motor does not have to run continuously, but can be timed to correspond to the forward position of the plunger 26 so that the wetted combined ash is compacted by the action of the vibrator. Timing control can also be adjusted in order to provide optimal results from different materials that would require more or less moisture. For example, if the present invention is used to dewater fly ash only, then a longer exposure time is necessary than for the combined ash.

In view of the foregoing, it should be apparent that there is provided by the present invention an apparatus for substantially dewatering combined ash by providing a vibrator device located at the exit portion of a quench bath. The dewatering apparatus includes a timing device which allows for the most efficient utilization of the vibrator as the combined ash is moved through the inclined portion of the quench bath. Thus, the present invention reduces the effects of free water run-off, a thixotropic quench bath product and yields a material that is readily handled by downstream conveyors and transport equipment. The present invention ultimately provides a stabilized material that is also ecologically viable.

Although only a preferred embodiment is specifically illustrated and described herein, it would be appreciated that many modifications and variations of the present invention are possible in light of the above teachings and within the purview of the appended claims without departing from the spirit and the intended scope of the invention. For example, the present invention can be applied to numerous materials that require a quenching step prior to disposal. An obvious application of this invention would be to any waste produced by combustion, such as slag or metallurgical waste, without departing from the spirit and intended scope of the invention.

What is claimed is:

1. An apparatus for treating combustion waste, comprising:
    quenching means for treating said combustion waste in a quenching liquid, said quenching means comprising:
        a quench bath having a curved portion;
        plunging means in said curved portion adapted to reciprocate in said quench bath; and
        a slanting discharge trough; and
    dewatering means for vibrating a portion of said slanting discharge trough, said dewatering means being timed to activate/deactivate based upon the position of said plunging means so as to substantially dewater said combustion waste when said combustion waste is above the level of said quenching liquid.

2. The apparatus according to claim 1, wherein said dewatering means imparts an oscillation to said slanting discharge trough and said combustion waste thus substantially compressing said combustion waste causing said quenching liquid to flow out of said combustion waste.

3. The apparatus according to claim 1, wherein said dewatering means imparts a vibrational effect across an entire width of said slanting discharge trough.

4. A method for dewatering combustion materials comprising the steps of:
    providing said combustion materials to a curved section of a quench bath;
    quenching said materials in a quenching liquid in said curved portion;
    moving said combustion materials up an inclined trough out of said curved portion and out of contact with said quenching liquid;
    vibrating said inclined trough to substantially compress and dewater said combustion materials whereby a reduction in the amount of free water run-off and a reduction in the thixotropic properties of said combustion materials are achieved; and
    timing said vibrating step to correspond to said movement of said combustion materials up said inclined trough.

5. The method according to claim 4, wherein said combustion materials comprise combined fly ash, bottom ash and residues.

6. The method according to claim 5, wherein said combined ash has an average moisture content of between 25-40% which is dewatered to an average moisture content of 15-25%.

* * * * *